United States Patent [19]

Meunier

[11] 4,318,229
[45] Mar. 9, 1982

[54] FLUIDIZING GRID

[75] Inventor: Georges Meunier, Boulogne, France

[73] Assignee: Tunzini Nessi Entreprises D'Equipements, Argenteuil, France

[21] Appl. No.: 169,266

[22] Filed: Jul. 16, 1980

[30] Foreign Application Priority Data

Jul. 16, 1979 [FR] France ............... 79 18352

[51] Int. Cl.³ .......................................... F26B 17/10
[52] U.S. Cl. .................... 34/57 B; 34/57 A; 432/15
[58] Field of Search .............. 34/10, 57 A, 57 B; 432/15, 58; 110/245

[56] References Cited

U.S. PATENT DOCUMENTS 3,215,508 11/1965 Piester ............................ 34/57 A
3,954,390 5/1976 Akhundov et al. .

FOREIGN PATENT DOCUMENTS 1352298 3/1962 France .

Primary Examiner—Larry I. Schwartz
Attorney, Agent, or Firm—Pennie & Edmonds

[57] ABSTRACT

The invention covers a fluidizing grid capable of high temperature operation, comprising a series of vertical fluidizing tubes attached to a support. This grid comprises a metal tank on the bottom of which are attached metal fluidizing tubes, of equal length, protruding an equal amount from the bottom to thereby allow a layer of particles to rest on the bottom of the tank and form a thermal screen.

7 Claims, 3 Drawing Figures

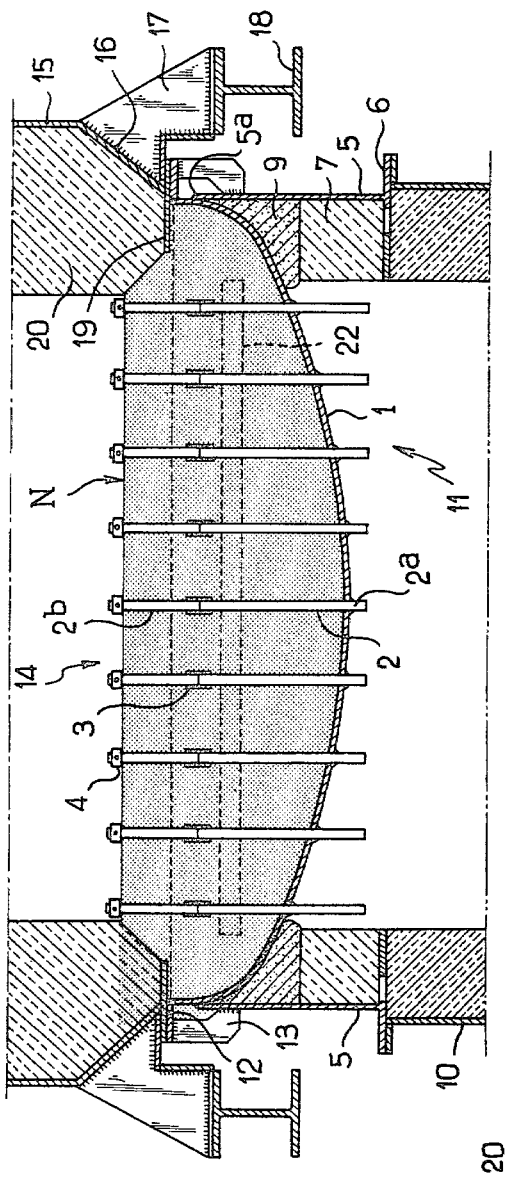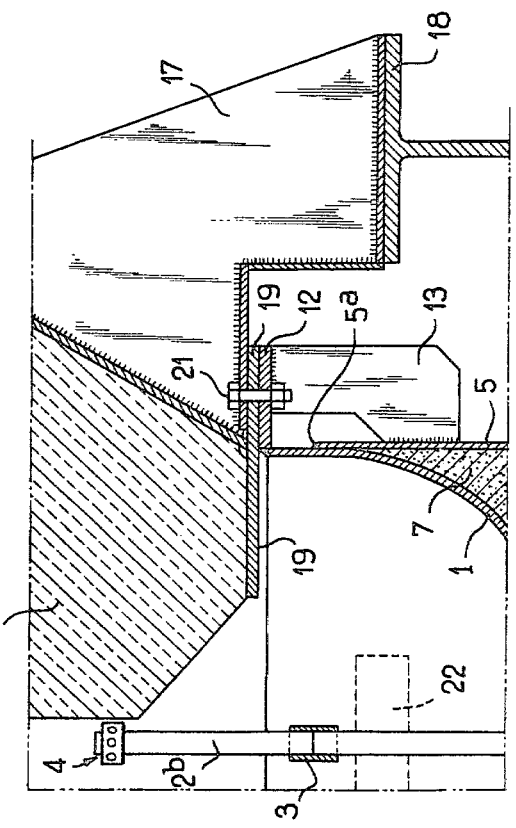

FLUIDIZING GRID

FIELD OF THE INVENTION

This invention relates to a grid for fluidizing solid particles used in particular with high temperature operations.

BACKGROUND OF THE INVENTION

A known method of effecting the fluidizing of solid particles at high temperatures is to use wind boxes closed off by a grid comprising a series of vertical fluidizing tubes immersed in a vault of refractory blocks. This type of grid has a number of disadvantages. For example, such a grid is sensitive to expansion differences of the constituent materials so that it is difficult to seal. The interstices in the grid allow a certain quantity of fluidizing air to pass or permit the escape of a portion of the solid particles to be fluidized thereby causing gradual erosion of the grid. At the same time, such grids do not allow for replacement of the tubes to modify the distribution of the fluidizing gas in terms of the material to be fluidized or when they are worn out.

It is therefore an object of this invention to provide for a grid construction that will overcome these disadvantages.

GENERAL DESCRIPTION OF THE INVENTION

Broadly the invention relates to a fluidizing grid with vertical metal tubes comprising a metal tank to which the tubes are attached on the bottom. Preferably the tubes are of the same length and diameter and emerge from the bottom of the tank and terminate at the same height thereby allowing a layer of particles to rest on the bottom of the tank below the level of ports and so form a thermal screen.

The grid according to this invention is easy to build, is permanently tight at high and low temperatures, allows the fluidizing tubes to be equipped with easy-to-replace gas injection nozzles, and provides for proper cooling of the latter while assuring sufficient thermal insulation between the fluidized bed and the wind box. Expansion stresses are minimized due to the height of the layer of solid particles which are not carried away by the fluidizing gas.

To that end, in the grid according to this invention, the support for the tubes is provided by a standardized curved bottom of the type used on tanks or vats for liquids such as wines, fuel oil, etc., or gases, and therefore, not expensive to build. Since the concavity of the curved bottom is toward the top, it offers good resistance to the mechanical stresses resulting from the weight of the particles or from expansion. To reduce expansion even further, the upper edge of the sides of the tank reaches a level that is substantially below the level of the fluidizing gas injection ports.

A curved bottom of this type, because it is only partially fitted onto a metal ferrule attaching it to the wind box, makes it possible to obtain a complete seal because it is welded onto the ferrule. It is, moreover, possible to check the seal from the outside on a permanent basis.

The metal fluidizing tubes are advantageously equipped, at their upper end, with an injection head consisting of horizontally aimed fluidizing nozzles. This type of injection head makes it possible to prevent nearly all movement of solid particles toward the wind box mounted at the bottom.

The metal fluidizing tubes can comprise two sections joined by a sleeve, the lower section being attached to the bottom of the tank, with the injection head forming part of the upper section of tube. Such an arrangement makes it possible to replace the injection heads easily and therefore to adapt the tubes to the grid operating conditions.

In order to increase the thermal insulation between the fluidized bed and the wind box located on the bottom, it is possible to position, about midway up the fluidizing tubes and, of course, under the mounting sleeves, if any, a slab of light insulating concrete arranged in such a way that it does not make contact with the metal tank. This slab, the thickness of which can range, for example, between 50 and 100 mm, can be poured after the bottom of the tank has been filled to the desired level with an initial layer of solid particles. This type of slab also further improves the mechanical strength of the fluidizing tubes.

Other elements, objectives and advantages of this invention will appear from a reading of the following description of one exemplified embodiment carried out according to the attached drawings.

BRIEF DESCRIPTION OF THE DRAWINGS

FIG. 1 is a cross-section of a grid constructed according to this invention;

FIG. 2 is an enlarged view of a portion of FIG. 1 showing the fastening of the grid on its periphery; and FIG. 3 is an enlarged cross-section of an injection head used pursuant to this invention.

BEST MODE FOR CARRYING OUT THE INVENTION

The grid shown in FIG. 1 includes a tank with a curved bottom 1 of refractory steel the sides of which rise upwardly such that the inner upwardly facing bottom surface of the tank is concave in shape. A series of tubes also made of refractory steel and all of the same length are fastened to the curved bottom of the tank at 2. To prevent any risk of leaking that would be dangerous to the strength of the grid, the lower portion 2a of the tubes is expaned and welded to the bottom 1 so that a tight seal is created between the tubes and the curved bottom. Each tube 2 has its upper section 2b connected to a lower section 2a by means of a threaded sleeve 3. An injection head is mounted onto the upper portion of section 2b of each tube 2.

The bottom 1 is partially fitted onto a ferrule 5 the lower portion of which has a flange 6 with an insulating lining 7 of light concrete plus a packing of fibrous refractory material 9. The lower flange 6 is mounted onto the side walls 10 of a wind box 11. The upper edge of the ferrule 5 is welded at 5a, in a water tight and accessible manner, onto the outside portion of the bottom 1. Finally, a flange 12, also attached to the ferrule 5 by twelve gussets 13, is welded to the outer upper edge of the bottom 1. The outside wall of the fluidizing chamber 14 comprises a ferrule 15 the lower tilted portion 16 of which rests on feet 17 onto a frame comprising beams 18. The lower portion 16 is equipped with a flange 19 which serves to support the refractory material 20 forming the inside lining of the fluidizing chamber. This flange 19 partially overhangs the tank on its periphery and flange 12 is mounted onto it by bolts, as at 21, so that the grid and wind box assembly are suspended in a removable manner under the chamber 14. A layer of non-fluidized particles remains below the level N of the heads 4 to form a thermal screen.

As shown in dotted lines on FIGS. 1 and 2, a slab 22 made of light concrete can be positioned on the bottom sections 2a of the tubes 2 in order to improve thermal insulation between the fluidizing chamber 14 positioned at the top of the tank and the wind box 11 positioned at the bottom of the tank 1.

As shown in FIG. 3, the injection head 4, which comprises the end of the upper section 2b of each tube 2, is equipped with a bushing 23 surrounding the top of this upper section and a sealing washer 24 welded at the end, with six holes 25 horizontally traversing the tube and the bushing 23 so as to permit radial flow of the fluidizing gas, thereby preventing the penetration of solid fluidized particles into the fluidizing tubes 2.

By way of example, a column of the type shown on the drawings, with an outside diameter of 2.40 m, an inside diameter of 1.50 m, and containing 381 fluidizing tubes 2 with an inside diameter of 16 mm and a total height of 570 mm, was put into operation by injecting air at 20° C. into the wind box 11 at the rate 1400 m³ hour. The column was used to fluidize sand with an average particle size of 180 microns, by injecting fuel just above the fluidizing grid at the rate of 115 kg/hour. In this way, a fluidized bed was formed consisting of sand particles, the bed being 1.50 m thick and at at temperature of 1200° C. The curved bottom 1 of the tank had its temperature raised to only 150° C. for a non-fluidized sand bed 530 mm high. No movement of fluidized sand toward the wind box 11 was observed.

I claim:

1. A fluidizing grid for use in a fluidizing chamber in order to fluidize solid particles at high temperatures, said grid comprising a support in the form of a metal tank having an inner upwardly facing concave bottom surface including curved sloping sides, a plurality of vertically extending metal fluidizing tubes traversing said bottom surface and extending upwardly therefrom so that their upper ends lie in a common horizontal plane and so that the height of the tubes above the bottom surface is sufficient to allow a layer of particles to rest on the bottom surface to form a thermal screen, an injection port on an upper section of each tube with the curved sloping sides extending upwardly to a level below the level of the injection ports, and a metal ferrule welded to an upper outside portion of the curved sloping sides and into which said sides partially fit whereby said grid may be connected to wind box.

2. A fluidizing grid according to claim 1 wherein the upper outer edge of the curved sloping sides of the tank has a flange thereon adapted to anchor the tank to walls of a fluidizing chamber.

3. A fluidizing grid according to claim 1 where the ferrule has a flange thereon adapted for anchoring the curved side walls to the wind box and so that the grid and wind box may be removably suspended underneath a fluidizing chamber.

4. A fluidizing chamber according to claim 1 wherein an insulating lining is fitted to an inside surface of the ferrule.

5. A fluidizing grid according to claim 1 wherein said curved bottom of the tank is of standardized construction.

6. A fluidizing grid according to claim 1 wherein each said tube comprises an upper section and a lower section connected by a sleeve, wherein said lower section is welded to said bottom to form said sealing means and wherein said upper section has an injection head thereon having horizontal fluidizing nozzles to form the injection port.

7. A fluidizing grid according to claim 1 having in addition a slab of light insulating concrete positioned in said tank substantially half-way up the fluidizing tube and spaced from the sloping sides.

* * * * *